United States Patent
Stumphauzer, II et al.

(10) Patent No.: US 10,499,018 B2
(45) Date of Patent: Dec. 3, 2019

(54) SYSTEM AND METHOD FOR IMPROVED UPDATING AND ANNUNCIATION OF TRAFFIC ENFORCEMENT CAMERA INFORMATION IN A VEHICLE USING A BROADCAST CONTENT DELIVERY SERVICE

(71) Applicant: Sirius XM Radio Inc., New York, NY (US)

(72) Inventors: William Carl Stumphauzer, II, Livingston, MI (US); Todd Darrell Van Zandt, Los Angeles, CA (US)

(73) Assignee: Sirius XM Radio Inc., New York, NY (US)

( * ) Notice: Subject to any disclaimer, the term of this patent is extended or adjusted under 35 U.S.C. 154(b) by 0 days.

(21) Appl. No.: 16/268,172

(22) Filed: Feb. 5, 2019

(65) Prior Publication Data

US 2019/0273894 A1    Sep. 5, 2019

Related U.S. Application Data

(63) Continuation of application No. 15/799,492, filed on Oct. 31, 2017, now Pat. No. 10,200,658, which is a
(Continued)

(51) Int. Cl.
*H04N 7/18* (2006.01)
*G06K 9/00* (2006.01)
(Continued)

(52) U.S. Cl.
CPC ......... *H04N 7/183* (2013.01); *G01C 21/3682* (2013.01); *G01S 19/14* (2013.01);
(Continued)

(58) Field of Classification Search
CPC .................................................... H04N 7/183
(Continued)

(56) References Cited

U.S. PATENT DOCUMENTS

2007/0268121 A1 * 11/2007  Vasefi ............... G06Q 10/06
                                                                340/506
2008/0303693 A1 * 12/2008  Link, II ........... G08G 1/096741
                                                                340/905

(Continued)

*Primary Examiner* — Leron Beck
(74) *Attorney, Agent, or Firm* — Kramer Levin Naftalis & Frankel LLP (57) ABSTRACT

An enhanced broadcast data service with reports locations of traffic enforcement camera locations (e.g., red light cameras and speed cameras) to users. Traffic enforcement camera information is aggregated, verified (e.g., particularly as to traffic enforcement camera type) and stored (e.g., at a server). A broadcast signal comprising program channels and at least one data channel having traffic enforcement camera information is transmitted to a plurality of receivers. Receivers store at least a subset of the traffic enforcement camera information available from the server and synchronize to it using periodic transmitted updates. Receivers compare receiver location data with stored camera location data, and display or generate audible alerts when the receiver is within a selected geographic range of a traffic enforcement camera. Alerts can be filtered as to camera type. A alerts can employ different color camera icons superimposed on a screen map depending on camera type or whether the camera is newly added.

20 Claims, 8 Drawing Sheets

Related U.S. Application Data continuation of application No. 15/189,440, filed on Jun. 22, 2016, now Pat. No. 9,807,353, which is a continuation of application No. 12/984,768, filed on Jan. 5, 2011, now Pat. No. 9,466,212.

(60) Provisional application No. 61/292,358, filed on Jan. 5, 2010.

(51) Int. Cl.
| | | |
|---|---|---|
| *G01S 19/14* | (2010.01) | |
| *G08G 1/0967* | (2006.01) | |
| *G01C 21/36* | (2006.01) | |
| *G08G 1/137* | (2006.01) | |
| *G08G 1/09* | (2006.01) | |

(52) U.S. Cl.
CPC ..... *G06K 9/00785* (2013.01); *G08G 1/09675* (2013.01); *G08G 1/096716* (2013.01); *G08G 1/096775* (2013.01); *G08G 1/137* (2013.01); *G08G 1/091* (2013.01)

(58) Field of Classification Search
USPC .......................................................... 348/149
See application file for complete search history.

(56) References Cited

U.S. PATENT DOCUMENTS

| | | | | |
|---|---|---|---|---|
| 2009/0138186 | A1* | 5/2009 | Ray | G08G 1/0104 701/117 |
| 2009/0189979 | A1* | 7/2009 | Smyth | G08G 1/04 348/143 |
| 2009/0237510 | A1* | 9/2009 | Chen | G06K 9/209 348/159 |
| 2010/0250369 | A1* | 9/2010 | Peterson | G06Q 30/0261 705/14.58 |
| 2011/0150331 | A1* | 6/2011 | Young | G06T 3/4015 382/167 |

\* cited by examiner

| LOCATION# | CAMERA# | LATITUDE | LONGITUDE | Sirius_live | DATE LAST MODIFIED | DIRECTION1 | DIRECTION2 |
|---|---|---|---|---|---|---|---|
| 8800 | 3790 | 41.751306 | -87.585075 | YES | 8/1/2007 | 317 | - |
| 8801 | 3790 | 41.751562 | -87.585127 | YES | 8/27/2007 | 270 | - |
| 8802 | 3790 | 41.751912 | -87.585780 | YES | 8/27/2007 | 180 | - |
| 8803 | 3790 | 41.751799 | -87.586286 | YES | 8/27/2007 | 139 | - |
| 9549 | 3790 | 41.751394 | -87.586246 | YES | 8/27/2008 | 90 | - |
| 10662 | 3790 | 41.751195 | -87.585571 | YES | 8/27/2008 | 0 | - |

FIG. 6B

| ROAD | TOWN | STATE | CODE | COUNTRY | DESCRIPTION |
|---|---|---|---|---|---|
| 79th ST & S CHICAGO AVE | CHICAGO | ILLINOIS | IL | USA | RED LIGHT CAMERA |
| 79th ST & S CHICAGO AVE | CHICAGO | ILLINOIS | IL | USA | RED LIGHT CAMERA |
| 79th ST & S CHICAGO AVE | CHICAGO | ILLINOIS | IL | USA | RED LIGHT CAMERA |
| 79th ST & S CHICAGO AVE | CHICAGO | ILLINOIS | IL | USA | ACCIDENT BLACKSPOT |
| 79th ST & S CHICAGO AVE | CHICAGO | ILLINOIS | IL | USA | CAMERA INTERSECTION |
| 79th ST & S CHICAGO AVE | CHICAGO | ILLINOIS | IL | USA | ACCIDENT BLACKSPOT |

FIG. 6C

| DESCRIPTION2 | LIMIT (MPH) | LIMIT (KMPH) | VENDOR |
|---|---|---|---|
| - | 30 | 48 | REDFLEX |
| - | 30 | 48 | REDFLEX |
| ON SURFACE STREET | 30 | 48 | REDFLEX |
| - | - | - | - |
| DIRECTION NOT ENFORCED | 30 | 48 | - |
| ON SURFACE STREET | - | - | - |

SYSTEM AND METHOD FOR IMPROVED UPDATING AND ANNUNCIATION OF TRAFFIC ENFORCEMENT CAMERA INFORMATION IN A VEHICLE USING A BROADCAST CONTENT DELIVERY SERVICE

CROSS-REFERENCE TO RELATED APPLICATIONS

This application is a continuation of U.S. patent application Ser. No. 15/799,492, filed on Oct. 31, 2017, which issued as U.S. Pat. No. 10,200,658 on Feb. 5, 2019, which is a continuation of U.S. patent application Ser. No. 15/189,440, filed on Jun. 22, 2016, which issued as U.S. Pat. No. 9,807,353 on Oct. 31, 2017, which is a continuation of U.S. patent application Ser. No. 12/984,768, filed on Jan. 5, 2011, which issued as U.S. Pat. No. 9,466,212 on Oct. 11, 2016, which claims the benefit of U.S. provisional application No. 61/292,358, filed on Jan. 5, 2010, the entire contents of each of these applications are hereby incorporated by reference.

BACKGROUND OF THE INVENTION

Field of the Invention

The present invention relates to a system and method for an enhanced data service for a Satellite Digital Audio Radio Service (SDARS) that provides over the air (OTA) delivery of aggregated and verified speed camera and red light camera location data, along with location data of other types of traffic enforcement cameras. More particularly, the present invention relates to a system and method utilizing a SDARS system for broadcasting the camera location data to vehicles. The in-vehicle SDARS device and optionally a Vehicle Navigation (VNAV) service provide travelers with timely and precise camera location data. The enhanced data service can optionally facilitate the aggregation of speed camera, red light camera and other camera location data to provide timely camera location updates.

Description of the Related Art

A number of commercial databases exist which aggregate data relating to the locations of red light and speed cameras within a given geographic area. For example, camera location information can be obtained from private commercial services, police and emergency services, and voluntary user reports. A number of Global Positioning System (GPS)-based speed and red light camera detection systems exist which superimpose these aggregated locations of red light cameras and speed cameras with other location data on digital maps provided via factory-installed or after-market vehicle navigation systems, or otter GPS devices such as handheld or portable devices with navigation systems.

As with digital maps, the camera location data provided to users by conventional GPS-based speed and red light camera detection systems is generally updated by having users download updated camera location data to their GPS-devices via the internet. In other words, users must connect their GPS-devices to a personal computer or otherwise access the internet to download updated camera location data to their GPS-devices from a web site of a camera location content service provider for a fee (e.g., a monthly or other periodic subscription fee for a selected number of camera location database accesses, a selected fee for unlimited accesses, or a per-access fee).

A significant number of vehicles have a Satellite Digital Audio Radio Service (SDARS) radio for receiving audio content broadcast via a SDARS system. Some Global Positioning System (GPS) vendors offer GPS-based vehicle navigation data through satellite radio add-on devices. For example, a satellite radio can be provided which displays audio programming information from the SDARS, as well as display GPS data for a vehicle using maps downloaded from a GPS vendor or other full map database source.

Presently, no more than about 20% of newly manufactured vehicles include a navigation system such as a typical GPS navigation system having a full map database and routing capabilities. The remaining newly manufactured vehicles are non-navigation systems that may have, at most, static maps but no full map database or routing capabilities.

Thus, the majority of newly manufactured vehicles and existing vehicles may be categorized as non-navigation systems since they have no navigation as described above. Some of these vehicles can be categorized as a screen-based non-navigation system because they have a center console display (e.g., a display with 3.5" diagonal measurement or larger display). Such a display or screen can be used for informational purposes including SDARS infotainment services. Non-navigation system vehicles that have no such display or screen shall be categorized as screenless non-navigation systems for discussion purposes herein.

A need exists for improving vehicle position data with automatic and timely updated traffic enforcement camera location data (e.g., location data for speed cameras and other types of speed-related or traffic enforcement cameras) using an SDARS device and regardless of whether the vehicle is categorized as a navigation system or a non-navigation system. For example, a need exists for SDARS users to receive audio programming, as well as periodically updated traffic enforcement camera location data, using SDARS broadcast content and therefore without having to connect to the internet to obtain updated camera location data from a service provider.

Systems exist that permit users to report locations of traffic cameras. For example, Nokia's Trapster application for mobile phones provides community-enabled or crowd-sourced traffic camera reporting. In other words, commuters can download the application to their mobile phones and then use the application to report locations of traffic cameras of which they become aware to the service provider. Commuters can also use the application to determine the locations of traffic cameras that have been previously reported to the service provider by other commuters along their travel routes. A significant disadvantage of crowd-sourced traffic camera location data is that the data is not subject to quality checks. Commuters frequently cannot distinguish between traffic congestion cameras (i.e., cameras that only provide a live video feed of traffic congestion conditions) and traffic enforcement cameras (e.g., speed cameras, red light cameras, and other speed-related cameras), let alone distinguish between different types of traffic enforcement cameras. Thus, the reporting of traffic congestion cameras with no traffic enforcement monitoring capabilities dilutes the community-enabled traffic camera database, making the service less effective (e.g., subject to more false alarms regarding speed traps). A need therefore exists for a traffic enforcement camera location update service that employs aggregated and comprehensive traffic enforcement camera data that is subject to quality checks such as verification of camera-type and functionality for accuracy using data available from law enforcement agencies, municipalities and traffic enforcement camera manufacturers and vendors. A need also exists for a traffic enforcement camera location update service that distinguishes among different-types of traffic enforcement cameras in its database information and enables subscribers to customize the traffic enforcement camera data that they receive. For example, a need exists for a traffic enforcement camera location update service that enables a subscriber to inhibit generation of warnings for certain types of traffic cameras (e.g., to generate warnings for speed cameras but not red light cameras, or to generate different warnings for respective types of traffic enforcement cameras such as different display colors or different audible warnings to distinguish among the different types of traffic enforcement cameras that the subscriber may encounter).

SUMMARY OF THE INVENTION

Illustrative embodiments of the present invention address at least the above problems and/or disadvantages and provide at least the advantages described below. Accordingly, illustrative embodiments of the present invention provide a new data service (e.g., a subscription-based data service) to enhance SDARS or other broadcast service that provide traffic enforcement camera location data to vehicles via satellite/terrestrial networks and an existing broadcast service stream.

Illustrative embodiments of the present invention provide an apparatus and method for obtaining updated traffic enforcement camera location information from a vendor or data supplier and providing it into an SDARS broadcast signal for reception by SDARS receivers in vehicles. An in-vehicle traffic enforcement camera location service device operates in conjunction with the SDARS receiver to obtain updated traffic enforcement camera location information demultiplexed from a data channel in the SDARS broadcast signal while the SDARS receiver provides users with SDARS programming, and to store the updated traffic enforcement camera location information.

The updated traffic enforcement camera location information is verified for accuracy (e.g., reviewed and subject to quality assurance using corroborative information obtained from law enforcement agencies and municipalities that install and/or use traffic enforcement camera and traffic enforcement camera manufacturers and vendors). As described in more detail below, the updated traffic enforcement camera location information is stored in a database by the broadcaster and in a memory of the in-vehicle traffic enforcement camera location service device. The updated traffic enforcement camera location information comprises various fields of information to provide detailed information about the cameras in the database (e.g., location, type of camera, related speed, direction, and so on) to enable the in-vehicle traffic enforcement camera location service device to distinguish between the different types of traffic enforcement cameras and alert subscribers accordingly. It is to be understood that traffic enforcement cameras are distinguished from traffic cameras which merely provide live video feeds of traffic congestion conditions and which have no traffic enforcement monitoring capability (e.g., cannot detect if approaching vehicle has excessive speed or entered an intersection on red light). The updated traffic enforcement camera location information is verified to allow for omission of traffic camera data from the database that merely provides a live video feeds and no traffic enforcement monitoring capability.

Illustrative embodiments of the present invention provide an apparatus and method for comparing a present Global Positioning System (GPS) position or other position data of the vehicle with traffic enforcement camera location information received from the SDARS system and stored at the vehicle, and annunciating a warning signal to vehicle operator if a traffic enforcement camera is located within a selected proximity of the present vehicle position. The warning signal can be an audio signal or a visual display on a screen in the vehicle indicating to the vehicle operator the type of traffic enforcement camera that the vehicle is approaching and optionally the recommended action the vehicle operator should take.

Illustrative embodiments of the present invention provide an apparatus and method for comparing a present vehicle speed with a stored speed limit corresponding to the present position of the vehicle, and annunciating a warning signal to vehicle operator if the present vehicle speed exceeds the stored speed limit by a selected amount. The warning signal can be an audio signal or a visual display on a screen in the vehicle indicating that the vehicle operator needs to reduce the current vehicle speed.

Illustrative embodiments of the present invention provide the locations of high accident frequency areas. High accident locations are often used to determine the locations of future red light cameras and/or speed cameras. Consumers with an aftermarket car navigation system or other means for obtaining vehicle position data and an SDARS device will be able to take advantage of the enhanced data service.

Other aspects, advantages, and salient features of the invention will become apparent to those skilled in the art from the following detailed description, which, taken in conjunction with the annexed drawings, discloses illustrative embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF ILLUSTRATIVE EMBODIMENTS

The matters exemplified in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Contemporary vehicles can be provided with various types of equipment that allow for communication/interaction with various services and systems that may be controlled or otherwise used by vehicle operators. Examples of some services available to vehicle operators include a Satellite Digital Audio Radio Service (SDARS) that provides radio programming to listeners and Vehicle Communications, Navigation and Tracking (VCNT) services that provide various features such as telecommunications, remote vehicle function monitoring/controlling, vehicle position tracking and navigation. Sirius XM Radio Inc. is an example of an SDARS system. Some VCNT services provide solely vehicle position determination and navigation services (i.e., hereinafter referred to as vehicle navigation systems or VNAV systems), while other VCNT services also include one-way communications service for receiving traffic event information for use by a VNAV system. Further, OnStar Corporation's telematics service provided in General Motors vehicles is an example of another VCNT service that provides detection of collisions or other vehicle malfunctions and two-way telecommunications with a human responder, as well as vehicle position determination and navigation.

In accordance with illustrative embodiments of the present invention, the broadcast capability of an SDARS system is leveraged to provide an additional data service to SDARS users. It is to be understood, however, that the present invention can be implemented using broadcast services and systems other than SDARS. As described in more detail below, an SDARS broadcast is provided with periodically updated traffic enforcement camera location information that is received by SDARS receivers in vehicles and annunciated to vehicle operators via the vehicle audio system and/or a display. To use this additional data service, a vehicle preferably comprises at least an SDARS receiver and components needed to obtain vehicle position information (e.g., the vehicle has a GPS receiver for determining the vehicle location or a device or interface for receiving vehicle position information from another source) in accordance with an illustrative embodiment of the present invention. Thus, a SDARS provider or other provider of broadcast services can broadcast the traffic enforcement camera locations and other data (e.g., speed limits of selected roadways in selected coordinates of the system coverage area, and high frequency accident locations) over an existing broadcast service link (e.g., in one or more data channels of a Sirius XM Radio Inc. composite data stream providing SDARS and data services).

As described in more detail below, an in-vehicle device that implements an enhanced data service in accordance with an illustrative embodiment of the present invention receives the broadcast stream via Sirius XM Radio Inc.'s satellite/terrestrial networks, and demultiplexes data channel (s) therefrom to provide red light camera locations, photo radar (e.g., speed) camera locations, and/or other traffic enforcement camera data to the vehicle operator via a display and/or an audio signal (e.g., via the vehicle audio system). Consumers with an Original Equipment Manufacturer (OEM) or aftermarket car navigation system or other vehicle positioning device, and a data-capable SDARS tuner (e.g., a Sirius XM Radio Inc. tuner or compatible tuner), are therefore able use the enhanced data service in accordance with an illustrative embodiment of the present invention.

An enhanced data service in accordance with an illustrative embodiment of the present invention operates with different types of traffic enforcement cameras and other traffic monitoring devices. For example, illustrative embodiments of the present invention can employ information relating to any of the following: a speed camera (e.g., a speed camera that continuously monitors passing vehicle speed and is triggered by any vehicle entering a monitored area above a preset minimum speed); a red light camera (e.g., a red light camera that continuously monitors traffic signals and is triggered by any vehicle entering the intersection following a specified time after the signal has turned red); a speed on green (e.g., a speed on green camera that continuously monitors traffic signals and is triggered by any vehicle entering the intersection above a preset minimum speed); a camera or other device for monitoring a high accident frequency location (e.g., a place where road traffic accidents have historically been concentrated); a device for automatic license plate recognition (ALPR); average speed cameras (e.g., cameras that can determine an average speed of a vehicle along a section of roadway); point-to-point speed cameras (e.g., cameras that monitor a vehicle's speed between two selected points that can sometimes be as far apart as 30 miles), among other devices. As new camera types are introduced, an enhanced data service provider (e.g., Sirius XM Radio Inc.) can collaborate with OEMs to deploy new camera icons types and camera attribute fields. Cameras can be deployed that are used to enforce other laws. For example, congestion zone cameras can be included in the over-the-air (OTA) database at an enhanced data service provider that facilitate tire charging of commuter fees to drivers when they enter the center of major cities. ALPR cameras can be deployed to check if a vehicle has insurance, and cameras can be used to enforce cell phone use laws and seatbelt laws. It is to be understood that the foregoing list is not exhaustive and that information from other types of devices can be provided to the system 10 in accordance with an illustrative embodiments of the present invention.

The enhanced data service can be implemented in vehicles in which OEMs have provided navigation systems (e.g., systems that display points of interest such as gas stations, restaurants, and the like). Screen-based non-navigation systems, screenless non-navigation systems and aftermarket navigation systems that are compatible with SDARS or other broadcast data service (e.g., a Sirius XM Radio Inc. data service) can also be used to implement the enhanced data service in accordance with illustrative embodiments of the present invention. The satellite radio receiver preferably decodes both audio programming and data such as traffic enforcement camera location data simultaneously to allow for user enjoyment of infotainment content provided in the received broadcast stream, as well as timely updates to traffic enforcement camera location data and other data associated with the enhanced data service.

The enhanced data service, that is, the traffic enforcement camera location service is preferably delivered via over-the-air (OTA) systems and offers the current positions of speed cameras, red light cameras, speed on green cameras and high frequency accident locations, among other locations or cameras of interest. Unlike online and mobile speed trap services commercially available today, the traffic enforcement camera location service of illustrative embodiments of the present invention does not rely on user-generated content for camera location information. Instead, a location database is used that is preferably licensed from a commercial content provider, for example, which manages updates and monitors data quality as described above. The traffic enforcement camera location service is implemented, by way of an example, using a combination of an on-board or in-vehicle database that is periodically updated using OTA signal updates or other means to transmit traffic enforcement camera location updates to the in-vehicle devices 42 described below in connection with FIG. 2. Due to the long lead times generally associated with traffic enforcement camera installations, the enhanced data service or traffic enforcement camera location service implemented in accordance with illustrative embodiments of the present invention is generally more static in the nature of its data when compared to the data provided via fuel price or traffic congestion data services (e.g., services that provide live video feed of traffic congestion conditions due to rush hours or lane closures for road construction).

The illustrative embodiments of the present invention are advantageous over existing services that advise vehicle operators of red light camera and speed camera locations for a number of reasons including, but not limited to, providing automated as well as more up to date traffic enforcement camera location to vehicle operators. The traffic enforcement camera location information is provided to the SDARS uplink from a reliable and robust source 22 (FIG. 1) as described below. More specifically, the content is not generated by users of the service, for example, but rather by a content provider selected for data accuracy and coverage. In addition, the SDARS system or other broadcast system enhanced with traffic enforcement camera service can be delivered through multiple channels provided via satellite radio or satellite DAB or SDARS, High Definition (HD) radio, mobile communications networks, paging networks, internet, and/or MSN® Direct, Frequency Modulation (FM) with Radio Data System (RDS), Amplitude Modulation (AM) In-Band On-Channel (IBOC), Frequency Modulation (FM) In-Band On-Channel (IBOC), terrestrial Digital Audio Broadcast (DAB), Digital Radio Mondiale (DRM), and Integrated Services Digital Broadcasting—for Terrestrial Sound Broadcasting (ISDB-TSB), among other channels or data transmission options.

Figure 1:
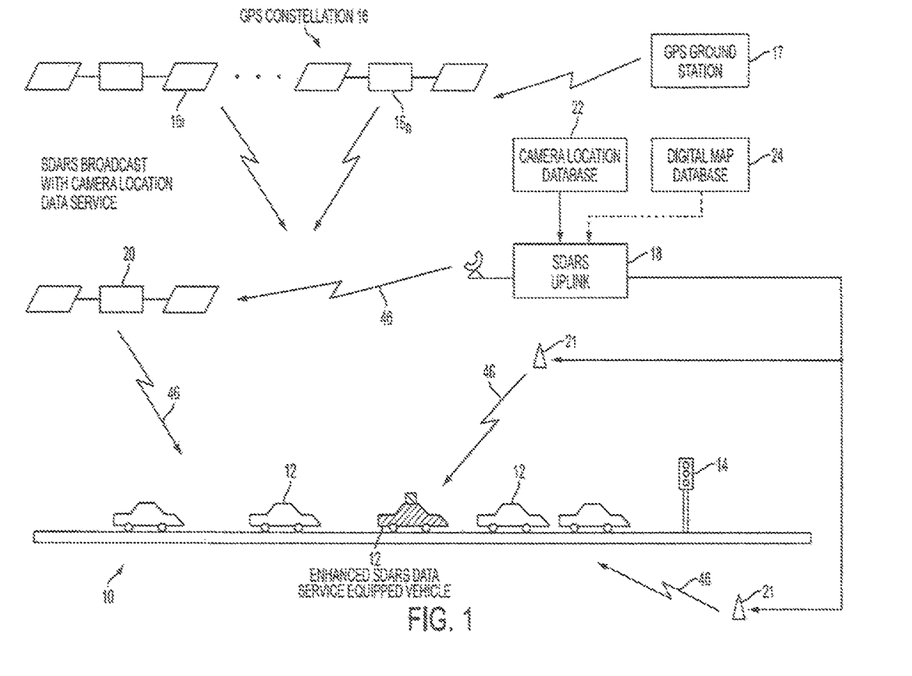
FIG. 1 depicts a satellite and/or terrestrial broadcast system (e.g. SDARS) configured to provide an improved traffic enforcement camera data service according to an illustrative embodiment of the present invention.

With reference to FIG. 1, a SDARS system 10 for providing an enhanced data service with traffic enforcement camera location information is depicted in accordance with an illustrative embodiment of the present invention. The system 10 comprises vehicles 12 equipped with one or more devices for delivering both SDARS and vehicle position data service to the vehicle occupant(s) to provide improved traffic enforcement camera information reporting. The locations of traffic enforcement cameras 14 and other traffic monitoring devices are provided to a camera location database 22. Locations of traffic congestion cameras with no traffic enforcement monitoring capability are preferably excluded from the database 22 to avoid dilution of its information and to enhance its accuracy.

Figure 2:
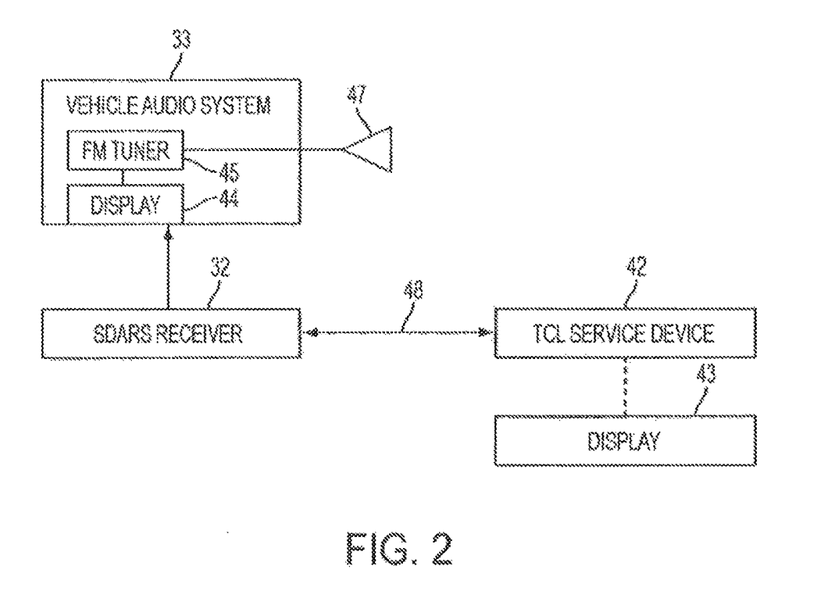
FIG. 2 is a block diagram of a user device comprising SDARS and traffic enforcement camera location data service components according to an illustrative embodiment of the present invention.

With reference to FIGS. 1 and 2, a vehicle 12 constructed in accordance with an illustrative embodiment of the present invention is provided with equipment for use with both a SDARS system or other broadcast system and a vehicle position service system. The vehicle 12 can be provided with a SDARS receiver 32 that is operable to receive and playback selected channels from a SDARS broadcast signal 46 via the audio system of the vehicle (e.g., a FM tuner and speaker system 33 provided in the vehicle that is interfaced with the SDARS receiver 32 to receive an output therefrom). The SDARS broadcast signal 46 is broadcast via a satellite 20 and/or terrestrial transmitters 21, and is provided to the satellite and/or terrestrial transmitter via an uplink 46 from an SDARS broadcast station 18. Illustrative examples of SDARS systems, devices and signal formats are disclosed in co-owned U.S. Pat. Nos. 7,454,166, 7,263,329, 7,180,917, 6,834,156, 6,564,003, 6,493,546 and 6,272,328, which are all incorporated herein by reference. In accordance with an illustrative embodiment of the present invention, the SDARS broadcast station 18 is provided with traffic enforcement camera location information from the database 22 (e.g., from a commercial content provider as described above). As described in more detail below, the SDARS broadcast station 18 receives periodic updates of traffic enforcement camera location information and other data from the database 22 and transmits it on data channels in the broadcast stream 46.

With continued reference to FIG. 1, a GPS ground station 17 and satellite constellation 16 comprising satellites $16_1$, . . . , $16_n$ are illustrated for providing vehicle positioning information to vehicles 12. It is to be understood that other systems and methods for providing vehicles 12 with position data can be used (e.g., a terrestrial-based positioning system). As stated above, the enhanced data service can be implemented in vehicles in which OEMs have provided navigation systems (e.g., systems that display points of interest such as gas stations, restaurants, and the like). In addition, screen-based non-navigation systems, screenless non-navigation systems and aftermarket navigation systems that are compatible with SDARS or other broadcast data service (e.g., a Sirius XM Radio Inc. data service) can also be used to implement the enhanced data service in accordance with illustrative embodiments of the present invention. An optional digital map database 24 is shown in FIG. 1 for providing digital maps to vehicles equipped to receive and display them (e.g., vehicles 12 categorized above as navigation systems).

With continued reference to FIGS. 1 and 2, the vehicle 12 further comprises a traffic enforcement camera location (TCL) data service device 42 that comprises a GPS device or vehicle positioning device, or an interface to a separate GPS device or vehicle positioning device, to determine the current location of the vehicle, and optionally its speed. Alternatively, the traffic enforcement camera location (TCL) data service device 42 comprises a user input interface that allows a user to identify a future route, or several vehicle locations along a proposed route, to enable the user to identify speed traps and other traffic enforcement areas employing cameras prior to departure.

The TCL data service device 42 has an interface 48 to the SDARS receiver 32 for receiving location information pertaining to red light cameras, speed cameras, and other cameras or traffic enforcement monitoring devices. This location information has been demultiplexed from a received SDARS broadcast signal 46 by the SDARS receiver 32. The TCL data service device 42 can optionally have a display 43 (e.g., FIGS. 5 and 6) for displaying digital maps, along with traffic enforcement camera information, that have been demultiplexed from a received SDARS broadcast signal 46 and are related to the current location of the vehicle (e.g., the locations of red light cameras, speed cameras or other traffic enforcement cameras within a selected area proximal to the current location of the vehicle are shown on the display 43). Alternatively, the display on the vehicle audio system 33 (e.g., radio display 44) can also be used, as illustrated in FIG. 7. Alternatively, or in addition to the display 43 or radio display 44, audible messages regarding the locations of red light cameras, speed cameras or other traffic enforcement cameras within a selected area that is proximate to the current location of the vehicle, or vehicle speed, or recommended speed adjustments needed relative to a proximate speed camera, can be generated via the TCL data service device 42 and annunciated via the SDARS receiver 32 and the vehicle audio system 33 (e.g., an FM radio comprising an FM tuner 45 and display 44, and speakers 47). Alternatively, the display 43 can be used to display digital maps, along with traffic enforcement camera information that have been demultiplexed from a received SDARS broadcast signal 46 and stored in the TCL data service device 42 that are related to a proposed location of the vehicle (e.g., the locations of red light cameras, speed cameras or other traffic enforcement cameras within a selected area proximal to the locations of the vehicle along a proposed route). This illustrative embodiment may be particularly useful for an in-home SDARS receiver or other Internet-enabled device that allows the supplier data from database 22 to be used for in-home applications such as trip planning and route selection.

With further reference to FIG. 2, the TCL data service device 42 comprises a controller (not shown) and a memory (not shown) and is programmed to process and store into the memory at least some or all of the traffic enforcement camera location information that was received via the interface 48. The memory can be integral to the TCL data service device 42 or a separate component connected to the TCL data service device 42. The memory preferably comprises data such as a traffic enforcement camera location data table(s) comprising location codes or identifiers and corresponding position data characterizing traffic enforcement cameras 14 in the system 10 as described in more detail below in connection with FIGS. 6A, 6B and 6C. The TCL data service device 42 has a GPS or other vehicle positioning device, or at least input for receiving positioning data from a separate GPS or other vehicle positioning device. The memory can also store current vehicle speed and the positioning data.

It is to be understood that the vehicle SDARS receiver 32 and TCL data service device 42 depicted in FIG. 2 or their corresponding components can be integrated, separate from each other, or have some common components. Further, it is to be understood that the enhanced SDARS data service system 10 can comprise other components than those depicted in FIG. 1 such as alternative or supplemental communication links to provide SDARS and vehicle positioning data to vehicles 12.

As stated above and in accordance with an illustrative embodiment of the present invention, the SDARS broadcast station 18 transmits a broadcast signal 46 comprising digital radio programming and ancillary data which can comprise red light camera and speed camera location information and other information relating to roadways. The SDARS broadcast station 18 modifies the SDARS broadcast signal 46 to update the traffic enforcement camera location information for the monitored roadways in the system 10. It is to be understood that red light camera, speed camera and other traffic enforcement device location information can be included in an SDARS broadcast signal 46 a number of different ways. For example, the SDARS broadcast signal 46 can include traffic enforcement camera location information as ancillary data transmitted with the digital radio programming in one or more of the plural channels of a composite data stream that constitutes a broadcast signal 46. Alternatively, the traffic enforcement camera location information can be provided on a dedicated auxiliary data channel.

Operation of the in-vehicle devices to implement the enhanced data service in accordance with an illustrative embodiment of the present invention will now be described with reference to FIG. 3. As indicated in step 100, a traffic enforcement camera location system 10 comprises as SDARS system for transmitting, in addition to audio programming, camera location information to vehicles 12. An SDARS receiver 32 in the vehicle 12 demultiplexes traffic enforcement camera location information from a received SDARS signal and provides it to an in-vehicle TCL data service device 42, which uses the demultiplexed camera location information to update traffic enforcement camera location information currently stored in a memory in the vehicle 12.

Figure 3:
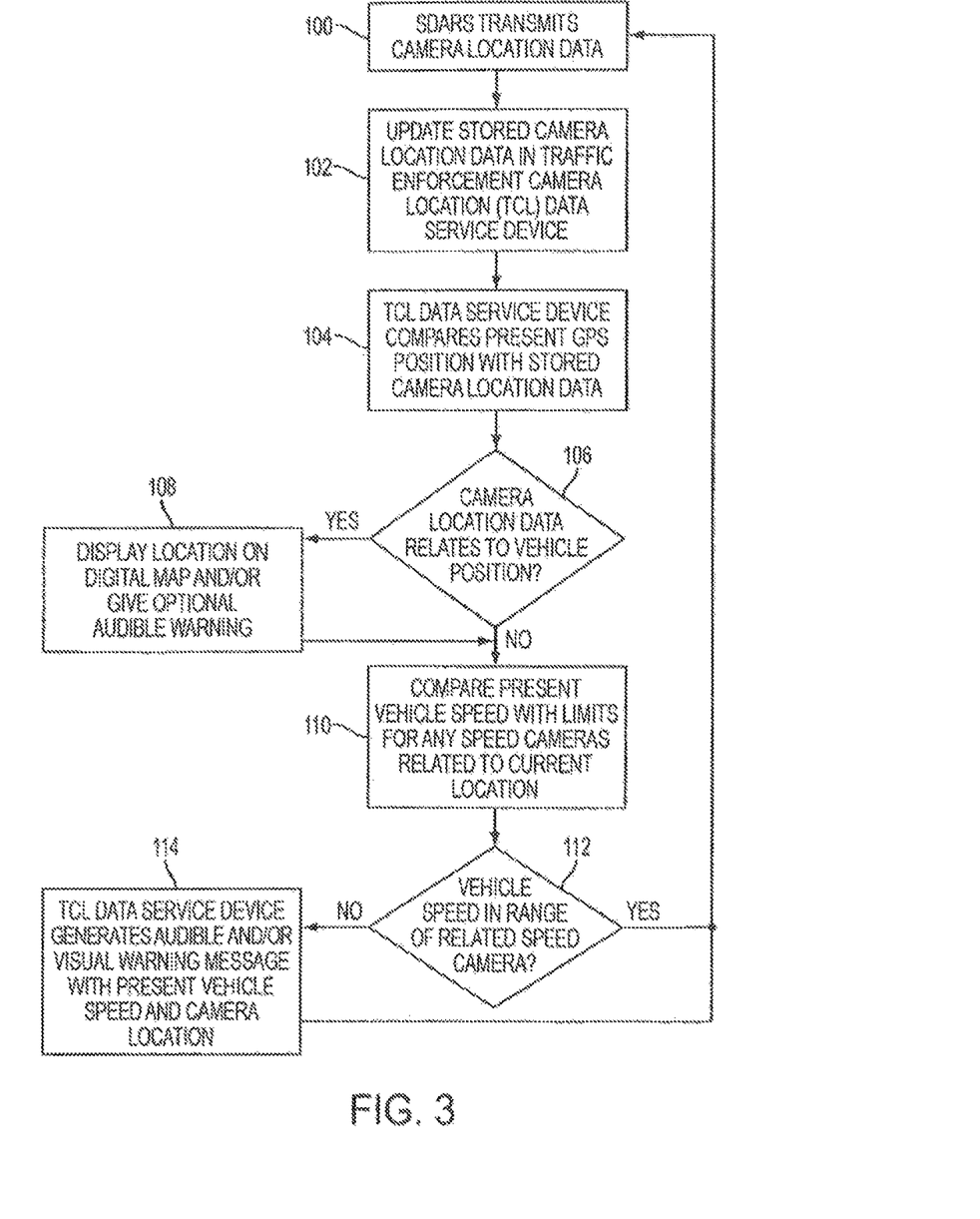
FIG. 3 is flowchart illustrating traffic enforcement camera location information processing by a user device according to an illustrative embodiment of the present invention.

With continued reference to FIG. 3, the in-vehicle TCL data service device 42 compares a present position of the vehicle 12 (e.g., current GPS data) with stored traffic enforcement camera location information (step 104). Alternatively, the TCL data service device 42 uses a user-inputted route or vehicle positions for the comparison with stored traffic enforcement camera location information in step 104. For example, coordinates indicating a current vehicle position can be compared to coordinates stored in the memory of the TCL data service device 42 to represent the locations of cameras and other traffic monitoring devices. If the present or user-inputted vehicle position is proximal to the location(s) of camera(s) stored at the TCL data service device 42 (step 106), then the location(s) of the proximal camera(s) are annunciated to the vehicle operator (e.g., displayed on a screen in the vehicle or provided as an audible message by the vehicle audio system), as indicated by step 108. The proximal camera(s) can be those camera(s) that have coordinates within a selected geographical range of the current or user-inputted vehicle position. The range can be preset, dynamic (e.g., change depending on whether the vehicle is in an urban area or rural area), specified by the manufacturer of the TCL data service device 42, and/or user selected in accordance with illustrative embodiments of the present invention.

With continued reference to FIG. 3, the in-vehicle TCL data service device 42 compares the current speed of the vehicle 12 (e.g., determined using changes in position indicated current GPS data, or received via the vehicle processor the controls the speedometer and other engine operations) with stored speed camera information (step 110). For example, a current vehicle speed can be compared to the speeds corresponding to speed camera locations and stored in the memory of the TCL data service device 42. If the present vehicle speed is outside a range of speeds associated with respective speeds of speed cameras proximal to the current vehicle position (step 112) or other stored speed data, then warnings(s) and/or location(s) of the proximal speed camera(s) are annunciated to the vehicle operator (e.g., displayed an a screen in the vehicle or provided as an audible message by the vehicle audio system), as indicated by step 114. The proximal speed camera(s) can be those camera(s) that have coordinates within a selected geographical range of the current vehicle position. The speed ranges can be preset, dynamic (e.g., change depending on whether the vehicle is in an urban area or rural area), specified by the manufacturer of the TCL data service device 42, and/or user selected in accordance with illustrative embodiments of the present invention. The audible message can include a general warning that the driver is approaching a speed monitored area of roadway and/or a recommendation to reduce speed.

It is to be understood that the processes described in connection with FIG. 3 can also include other comparisons of current or user-inputted vehicle data with other traffic enforcement data stored in the memory of the TCL data service device 42 such as data relating to average speed cameras, and point-to-point speed camera, high accident frequency locations, and so on.

Figure 4:
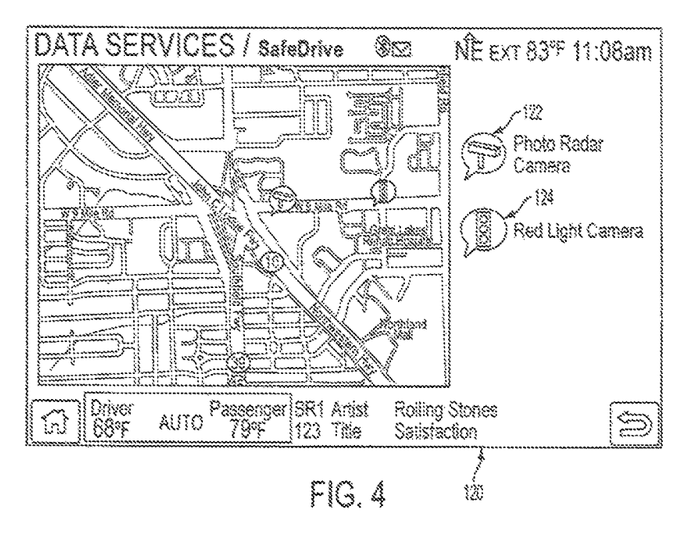
FIGS. 4 and 5 depict red light camera and speed camera locations displayed on a vehicle display screen according to illustrative embodiments of the present invention.
Figure 5:
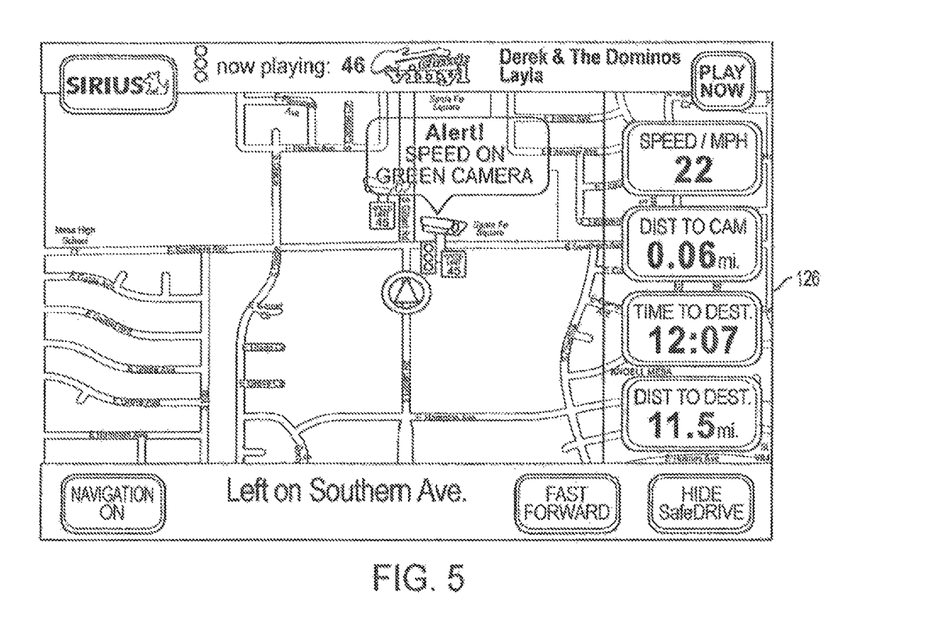

FIGS. 4 and 5 depict, respectively, how red light camera and speed camera locations and a speed on green camera location, for example, can be displayed on a vehicle navigation screen 120 or 126 on, for example, a display 43 according to an illustrative embodiment of the present invention. FIG. 4 depicts an illustrative screen 120 on a screen-based non-navigation device. FIG. 5 depicts an illustrative screen 126 on a navigation device. As described below, FIG. 7 depicts illustrative data provided on the display 43 of a screenless non-navigation device. The camera location data is coded an a digital map using icons (e.g., icons 122 and 124 in FIG. 4) to indicate the respective camera locations and types. Red light camera locations, photo radar (speed) camera locations and high accident frequency locations from various sources and other traffic enforcement monitoring devices are preferably aggregated by one or more traffic data suppliers or content providers and stored in a database accessible via their server. As explained above, the traffic enforcement camera data is preferably verified for quality assurance. A data server associated with the SDARS uplink 18 or broadcast service programming center polls the supplier's server periodically (e.g., every 5 minutes or longer) to update the data that is made available to the TCL data service devices 42 in vehicles. The data is then transmitted over satellite and terrestrial repeater networks (e.g., via the broadcast stream 46) for device 42 reception. FIG. 7 depicts an illustrative embodiment of a screenless non-navigation system head unit 128. The display 43 of the head unit 128 comprises basic information and/or a message regarding a proximate traffic enforcement camera location such as "Alert ! Approaching Speed on Green Camera."

Figure 6A:
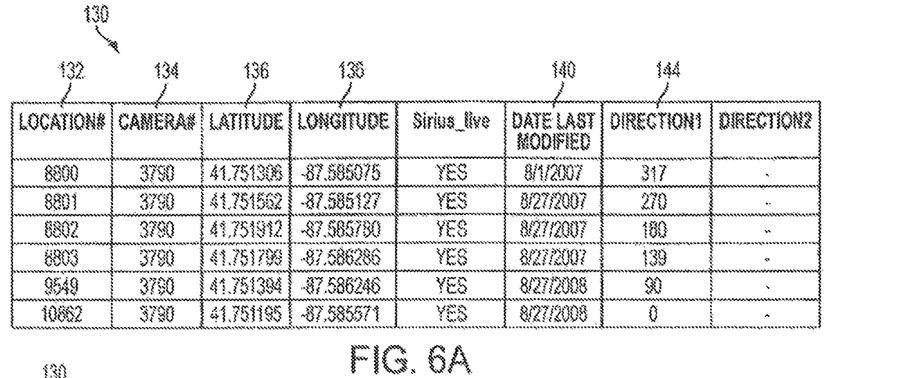
FIGS. 6A, 6B and 6C depict stored data attributes corresponding to traffic enforcement camera locations according to an illustrative embodiment of the present invention.
Figure 6B:
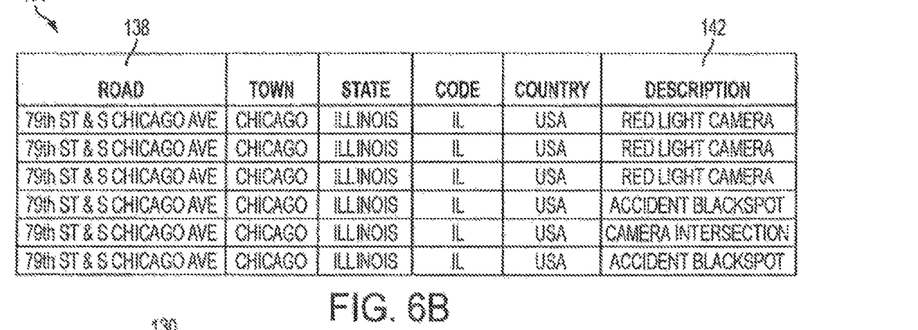
Figure 6C:
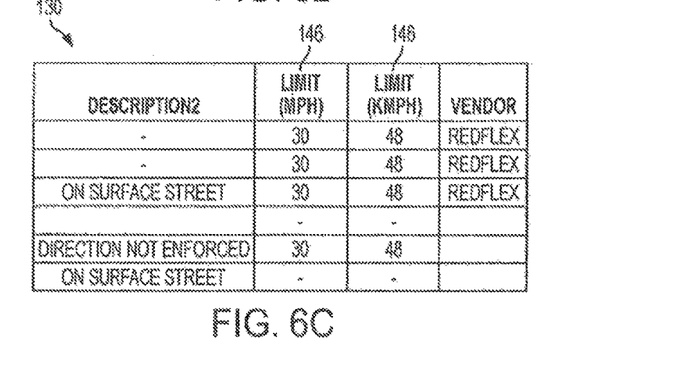
Figure 7:
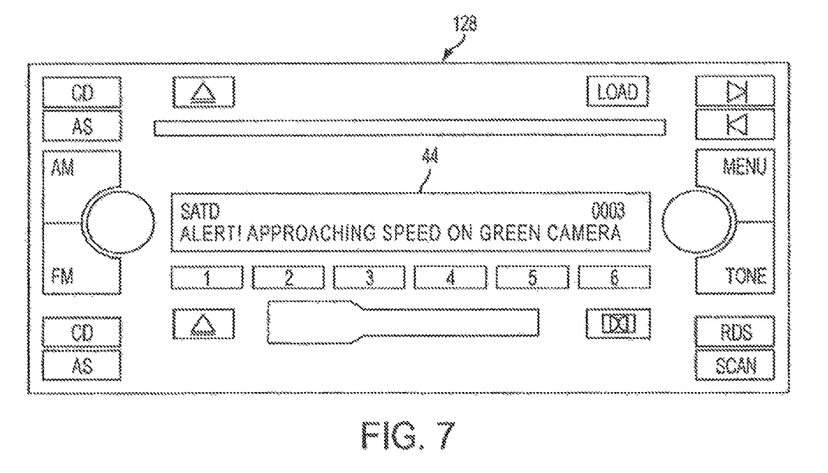
FIG. 7 depicts a vehicle screenless head unit for operation in connection with an SDARS receiver for a non-navigation system application illustrative embodiment of the present invention.

FIGS. 6A, 6B and 6C depict examples of data attributes 130 for stored traffic enforcement camera locations according to an illustrative embodiment of the present invention. For example, the memory at the uplink 18 that is used to generate the broadcast data channel comprising updated traffic enforcement camera location data and the memory at each of the data service devices 42 in vehicles 12 can be synchronized to include, for each stored traffic enforcement camera location 132, a traffic enforcement camera type identifier 134, position coordinates 136, among other attributes such as names of street intersections or geographic locations 138, date of last modification 140, and so on. The memory at each of the TCL data service devices 42 in vehicles 12 may include all or only a subset of the camera information available from the uplink 18 memory.

More specifically, and by way of an example, databases provided in the memories at the uplink 18 and at each of the TCL data service devices 42 in vehicles 12 can comprise a location identifier (ID) 134 for each location of a traffic enforcement camera, and information about the type of location 142 (e.g., red light camera, speed camera, high frequency accident, and so on). The databases can comprise location reference information such as the latitude and longitude coordinates 136 (e.g., decimal degrees) for each location. Directional information 144 can also be included in the databases to indicate which directions of approach to the location are covered by an alert (e.g., at a junction of at least two roads, the directional information indicates which road(s) at the junction are covered by a particular traffic enforcement camera). Additional information such as the speed limit 146 for a given location and street name(s) are also preferably stored in the databases at the uplink 18 and in the vehicles 12.

Figure 8:
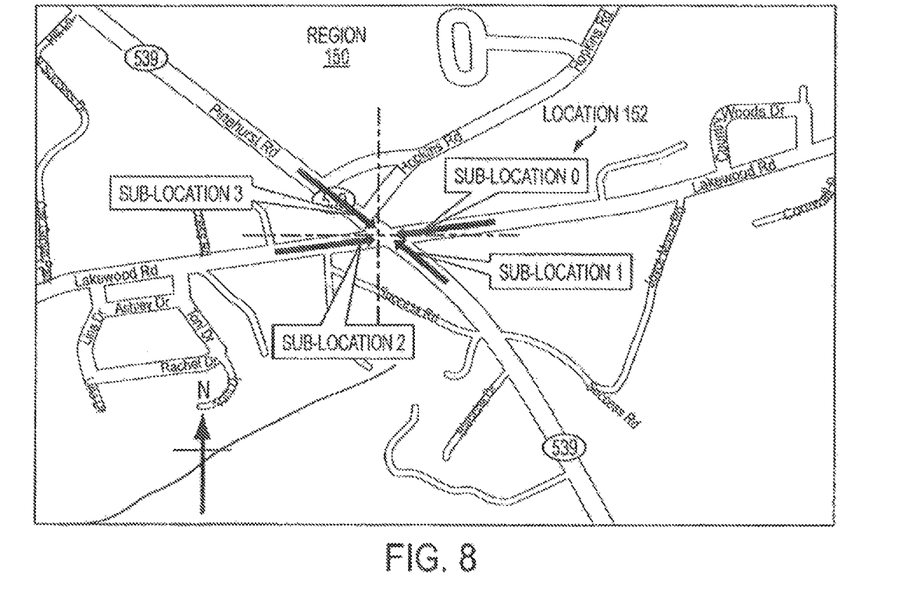
FIG. 8 depicts an illustrative location for which traffic enforcement camera location information is stored in databases according to an illustrative embodiment of the present invention.

In accordance with an illustrative embodiment of the present invention, a region in which a location belongs can be identified, as well as sub-location data (e.g., number of sub-locations and identifiers for respective sub-locations at a location), in the databases at the uplink 18 and in the vehicles 12. Sub-locations (e.g., sub-locations 0, 1, 2 and 3) can be assigned to locations such that each direction of approach with alert type at a location has a corresponding sub-location, as illustrated in FIG. 8. In other words, all locations have at least one sub-location. A four-way stop light that has red light camera enforcement on all four lights therefore has four sub-locations, whereas a four-way stop light that has red light camera enforcement on just two of the lights has only two sub-locations. A sub-location can include a speed limit value among the stored database information if a speed limit enforcement device is in effect. Each sub-location can have a direction of approach field in the databases to indicate the direction of travel (e.g., in degrees) when approaching the location.

In accordance with an illustrative embodiment of the present invention, the location identifiers are assigned using a hierarchical coding scheme to allow reduction in bandwidth required to broadcast updates to the in-vehicle traffic enforcement camera information databases and therefore permit faster update cycles without sacrificing accuracy. For example, locations of traffic enforcement cameras are generally correlated and located in dense clusters at both a large scale (e.g., in cities) and a small scale (e.g., intersections). Thus, regions are defined at each have a selected number of sub-regions, which each have a selected number divisions that, in turn, each have a selected number of locations. Codes can be provided for respective ones of the regions, sub-regions, divisions and locations such that, when locations share one or more of the hierarchical classes (e.g., regions, sub-regions, divisions and locations), the corresponding codes for those shared classes do not need to be transmitted in the location identifier, which can be a variable length field) in the updating messages provided in the broadcast stream 46.

Different formats can be used for the broadcast update messages in the broadcast steam 46. In accordance with an illustrative embodiment of the present invention, the updates are formatted as data packets on an auxiliary data channel in a broadcast stream 46. The packets comprise a number of fields, one of which can be a synchronization data field. The SDARS receiver 32, for example, can be configured to reconstruct the received broadcast signal to account for losses therein due to obstructions or drop outs in the broadcast signal. Signaling errors of a longer duration in the broadcast signal can result in the loss of the received signal stream and therefore the loss of synchronization with data packets provided in the signal stream for the enhanced data service. The synchronization data field allows a receiver 32 to reestablish synchronization with the data packets by searching the received data stream for the synchronization data field and determining if it is the beginning of the next data packet (e.g., by confirming a valid checksum follows it). If so, the receiver 32 is able to resynchronize on the beginning of the next data packet. Thus, the value for the synchronization data field can be provided anywhere within a data packet.

The uplink 18 and the content provider/supplier of the traffic enforcement camera location database 22 can mutually agree to a data feed update frequency from the database 22 to the uplink 18. Since traffic enforcement cameras can take several months to be approved and installed, it may not be necessary to employ an update frequency of less than 24 hours. For example, Sirius XM Radio's data server can poll the traffic data supplier's server every 24 hours to update the traffic enforcement camera locations that are provided to its OTA database by the broadcast service programming center and uplink 18. Updated information can be identified using change logs having dates and version control, or by comparing new data against existing data, among other methods. Sirius XM Radio then transmits the updated information over its satellite and terrestrial repeater networks (e.g., via broadcast signal 46) for device 32 reception. The camera locations can therefore be displayed to the vehicle operator within 90 seconds of a power cycle. For service optimization, the data from the service provider can be stored in the OTA database using two carousels, that is, one carousel for camera additions and the other carousel for camera removals. The updates from the carousel for camera additions can then be prioritized for inclusion in the data channels in the broadcast stream 46. A vehicle operator is less likely to object to a false positive than to a false negative (i.e., failure to provide an indication of the presence of a proximal traffic enforcement camera). In any event, camera additions and removals from the in-vehicle database information are preferably managed through OTA updates. The updates can include the introduction of new camera locations or modifications to the information stored regarding existing locations. Some traffic enforcement camera locations are so dynamic that it is not feasible to include their updates in a broadcast update. Such locations can instead be sent via a broadcast carousel (e.g., a broadcast carousel comprising long term and short term update carousels). In this instance, the broadcast carousel can be dedicated to updated camera locations.

Further, the uplink 18 and SDARS programming facility that generate the broadcast stream 46 can determine a frequency by which the broadcast data channel is changed to reflect updates in camera locations received from the supplier. For example, over the air updates of the OTA database employed by the programming center and uplink 18 can be provided to vehicle operators at 15 minute intervals via the broadcast stream 46. Also, a vehicle SDARS receiver 32 operating in conjunction with a TCL data service device 42 can be programmed to demultiplex the received broadcast channel and update the local memory comprising camera location data with the demultiplexed information at a selected frequency. It is recommended that the receiver 32 store a baseline of the camera location database to minimize service startup latency. After startup, the receiver 32 monitors the data channel(s) in the received broadcast stream 46 for any updates to its local camera location database. OEM devices 42 can be configured to permit the in-vehicle database to be continuously appended with new camera locations any time the vehicle is use. TCL data service devices 42 can also be configured to enable user controls and settings to filter, for example, the types of cameras to include or exclude from warnings generated, as described above, for that particular user.

Applications using OEM or Aftermarket Devices, or Internet-enabled devices allow the supplier data from database 22 to be used for both in-vehicle scenarios and in-home scenarios. For example, OEM embedded in-vehicle navigational or non-navigation systems can be used whereby a broadcast service provider such as Sirius XM Radio Inc. enters into a service Agreement with an automotive OEM to install systems in cars at an automotive OEM factory that are typically integrated into the vehicle dashboard and electronics. Aftermarket radios can also be used when no service agreement exists with an automotive OEM. For example, aftermarket radios can include, but are not limited to, portable navigational systems (PNS) that can be sold at retail, SDARS aftermarket devices, and systems that are sold and installed by car dealerships and the like. Aftermarket radios can be integrated into the vehicle electronics or components or not. In addition, internet-enabled devices can allow the traffic enforcement camera location data available from the database 22 and the uplink 18 to be made available over the Internet (e.g., on a password protected basis). For example, Internet subscribers to the SDARS data services such as Sirius-XM Radio's SafeDrive data service can access the data, as well as Sirius-XM Radio's Internet Radio subscribers.

Based on the data attributes available for each camera, a visual and/or audible alert can be generated when a customer's vehicle 12 is in proximity of a camera 14. In cases where the vehicle 12 is approaching a camera that is pointed away from the vehicle, an OEM device 42 can be configured to withhold visual or audible alerts.

As new camera locations are introduced, it can be helpful to the customer or vehicle operator to be able to differentiate a new addition to the in-vehicle database. New cameras, i.e., installed as recently as within the past 3 months, could be identified by the TCL data service device 42 using a unique icon or color on the vehicle display, for example. After a period of time mutually agreed to by the SDARS service provider and an OEM, for example, the TCL data service device 42 is configured to revert the new camera(s) to the same coding scheme as the legacy cameras in the in-vehicle database.

The present invention can be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Carrier waves (such as data transmission through the Internet via wired or wireless transmission paths) could also be an example of a computer-readable recording medium. Functional programs, codes, and code segments for accomplishing the present invention can be easily construed as within the scope of the invention by programmers skilled in the art to which the present invention pertains.

Illustrative embodiments of the present invention differ from current practices in a number of ways and offer many advantages. First, the content is not generated by users of the service, but by a supplier or content provider selected for data accuracy and coverage. This is advantageous since user-generated content can be prone to errors in both location and time. Secondly, the service can be delivered through multiple channels, including, but not limited to, satellite radio, HD radio, cell phone, or MSN Direct. Further, more frequent updates to in-vehicle databases for traffic enforcement camera location information are made possible due to the integration of updated information into the data channel(s) of an existing audio programming broadcast stream that is transmitted OTA to receivers programmed to continuously demultiplex the audio and data channels (preferably simultaneously) in the received stream.

In addition, SDARS currently provides travel advisories for several cities or traffic markets. Photo radar and other traffic enforcement cameras are located in a majority of these traffic markets; however, there will likely be more camera location markets than traffic markets. Thus, SDARS data services allow for greater market expansion to leverage the use of SDARS for additional services and revenue from an SDARS system.

A backlink can be provided in the system 10 to permit user reporting of camera location data such as mobile unit photo radar camera. Reference is made to related U.S. application Ser. No. 12/098,085, filed on Apr. 4, 2008, the subject matter of said application being hereby incorporated herein by reference, with regard to an illustrative backlink.

While certain illustrative embodiments of the invention have been shown and described herein with reference to certain preferred embodiments thereof, it will be understood by those skilled in the art that various changes in form and details may be made therein without departing from the spirit and scope of the invention as defined by the appended claims and their equivalents.

What is claimed is:

1. A method for providing enhanced data services including traffic enforcement camera alerts by an in-vehicle system, the method comprising:
    receiving, by the in-vehicle system and via a broadcast signal, the enhanced data services including a plurality of program channels and ancillary data received via at least one of the plurality of program channels, wherein the ancillary data includes traffic enforcement camera information for one or more cameras;
    demultiplexing, by the in-vehicle system, the traffic enforcement camera information from the broadcast signal, wherein the traffic enforcement camera information includes location information for each camera of the one or more cameras;
    determining, by the in-vehicle system, a direction of approach of a vehicle of the in-vehicle system relative to each proximal camera of the one or more cameras based on comparing the location information for each camera with a position of the in-vehicle system; and
    generating, by the in-vehicle system, at least one traffic enforcement camera alert based on the direction of approach of the vehicle coinciding with a camera-facing direction of at least one proximal camera that is located within a predetermined geographic range of the in-vehicle system.

2. The method of claim 1, further comprising:
    prior to the determining the direction of approach of the vehicle, updating location information corresponding to at least one proximal camera of the one or more cameras in a memory of the in-vehicle system based on the demultiplexed traffic enforcement camera information.

3. The method of claim 2, wherein the at least one proximal camera is located within the predetermined geographic range of the in-vehicle system.

4. The method of claim 1, wherein the traffic enforcement camera information includes at least one of data corresponding to a new traffic enforcement camera, data indicative of deletion of at least one traffic enforcement camera, and data indicative of changes to stored information associated with at least one identified traffic enforcement camera.

5. The method of claim 1, wherein the predetermined geographic range includes at least one sub-location associated with the at least one proximal camera.

6. The method of claim 5, wherein the at least one proximal camera is a red light camera.

7. The method of claim 5, wherein the at least one proximal camera is a speed camera associated with a speed limit, and wherein the generating the at least one traffic enforcement camera alert is based on determining that a vehicle speed is approaching the speed limit.

8. The method of claim 1, wherein the proximal cameras include at least one of speed cameras and red light cameras.

9. The method of claim 1, further comprising:
    demultiplexing, by the in-vehicle system, at least one program channel of the plurality of program channels; and
    causing playback of the demultiplexed at least one program channel.

10. The method of claim 1, wherein the generating the at least one traffic enforcement camera alert is based on annunciating selected traffic enforcement camera information associated with the at least one proximal camera from a memory of the in-vehicle system.

11. The method of claim 10, further comprising:
    filtering the annunciating the selected camera information based on user inputs via a user interface of the in-vehicle system.

12. The method of claim 1, wherein the broadcast signal is a satellite digital audio radio service (SDARS) signal and the in-vehicle system is a SDARS infotainment system.

13. The method of claim 1, wherein the ancillary information includes location information associated with high accident frequency regions, and wherein the generating the at least one traffic enforcement camera alert includes causing display of at least one high accident frequency region.

14. The method of claim 1, further comprising:
    causing display of a location of the at least one proximal camera via at least one of a navigation display and a radio display of the in-vehicle system.

15. A system for providing enhanced data services including traffic enforcement camera alerts, the system comprising:
    a broadcast transmitter configured to transmit a broadcast signal including a plurality of program channels and ancillary data, wherein the ancillary data is part of at least one of the plurality of program channels and includes traffic enforcement camera information for one or more cameras; and
    an in-vehicle system comprising a processing device, memory, and a broadcast receiver, the broadcast receiver configured to:
    receive the broadcast signal;
    demultiplex the ancillary data from the broadcast signal to obtain the traffic enforcement camera information, wherein the traffic enforcement camera information includes location information for each camera of the one or more cameras;
    determine a direction of approach of a vehicle of the in-vehicle system relative to each proximal camera of the one or more cameras based on comparing the location information for each camera with a position of the in-vehicle system; and
    generate at least one traffic enforcement camera alert based on the direction of approach of the vehicle coinciding with a camera-facing direction of at least one proximal camera that is located within a predetermined geographic range of the in-vehicle system.

16. The system of claim 15, wherein the broadcast signal is a satellite digital audio radio service (SDARS) signal and the in-vehicle system is a SDARS infotainment system.

17. The system of claim 15, wherein the at least one proximal camera is a speed camera associated with a speed limit, and wherein the generating the at least one traffic enforcement camera alert is based on determining that a vehicle speed is approaching the speed limit.

18. The system of claim 15, wherein the in-vehicle system is further configured to:
   cause display of a location of the at least one proximal camera via at least one of a navigation display and a radio display of the in-vehicle system.

19. The system of claim 15, wherein the in-vehicle system is further configured to:
   generate the at least one traffic enforcement camera alert based on annunciating selected traffic enforcement camera information associated with the at least one proximal camera from the memory of the in-vehicle system.

20. The system of claim 15, wherein the traffic enforcement camera information includes at least one of data corresponding to a new traffic enforcement camera, data indicative of deletion of at least one traffic enforcement camera, and data indicative of changes to stored information associated with at least one identified traffic enforcement camera.

* * * * *